US009511735B2

(12) United States Patent
Schlup, Jr.

(10) Patent No.: US 9,511,735 B2
(45) Date of Patent: Dec. 6, 2016

(54) FORWARDLY AND REARWARDLY FOLDING ROLL-OVER PROTECTION STRUCTURE

(71) Applicant: Full Vision, Inc., Newton, KS (US)

(72) Inventor: Kenneth G. Schlup, Jr., Newton, KS (US)

(73) Assignee: Full Vision, Inc., Newton, KS (US)

( * ) Notice: Subject to any disclaimer, the term of this patent is extended or adjusted under 35 U.S.C. 154(b) by 0 days.

(21) Appl. No.: 14/798,063

(22) Filed: Jul. 13, 2015

(65) Prior Publication Data
US 2016/0009238 A1 Jan. 14, 2016

Related U.S. Application Data

(60) Provisional application No. 62/023,617, filed on Jul. 11, 2014, provisional application No. 62/065,542, filed on Oct. 17, 2014.

(51) Int. Cl.
B60R 21/13 (2006.01)
(52) U.S. Cl.
CPC ............ B60R 21/13 (2013.01); B60R 21/131 (2013.01); *B60R 2021/134* (2013.01)
(58) Field of Classification Search
CPC ............ B60R 21/13; B60R 2021/132; B60R 2021/134
USPC ........................................................ 280/756
See application file for complete search history.

(56) References Cited

U.S. PATENT DOCUMENTS

| 4,770,458 | A | * | 9/1988 | Burke | B62D 33/0222 224/405 |
| 5,042,835 | A | * | 8/1991 | Burns | B60R 21/131 280/756 |
| 7,568,732 | B2 | | 8/2009 | Schlup, Jr. | |
| 8,113,563 | B1 | * | 2/2012 | McCann | B60P 3/40 224/405 |
| 2005/0212278 | A1 | * | 9/2005 | Kurten | F16C 11/10 280/756 |
| 2007/0252371 | A1 | * | 11/2007 | Schlup | B60R 21/131 280/756 |
| 2007/0290493 | A1 | * | 12/2007 | David | B60R 21/13 280/756 |
| 2013/0049338 | A1 | * | 2/2013 | Alexander, IV | B60R 21/131 280/756 |

FOREIGN PATENT DOCUMENTS

| DE | 102013103833 A1 * | 10/2014 | ............ B60R 21/13 |
| JP | 0623844 U * | 3/1994 | ............ B60R 21/13 |

OTHER PUBLICATIONS

Mar. 29, 1994, JPO, JP 06/23844 U, Machine Translation of Description.*

* cited by examiner

Primary Examiner — James English
(74) Attorney, Agent, or Firm — Hovey Williams LLP

(57) ABSTRACT

A foldable roll-over protection structure is provided for use on a vehicle movable in a generally fore-and-aft direction. The foldable roll-over protection structure includes a frame comprising a base section and an upper section. The base section is connectable to the vehicle. The upper section is swingable relative to the base section between a forward position in which the upper section projects forwardly from the base section, a rearward position in which the upper section projects rearwardly from the base section, and an upright position positioned between the forward and rearward positions. A hinge assembly swingably interconnects the sections of the frame. The hinge assembly is configured to releasably secure the upper section in each of the positions of the upper section.

15 Claims, 12 Drawing Sheets

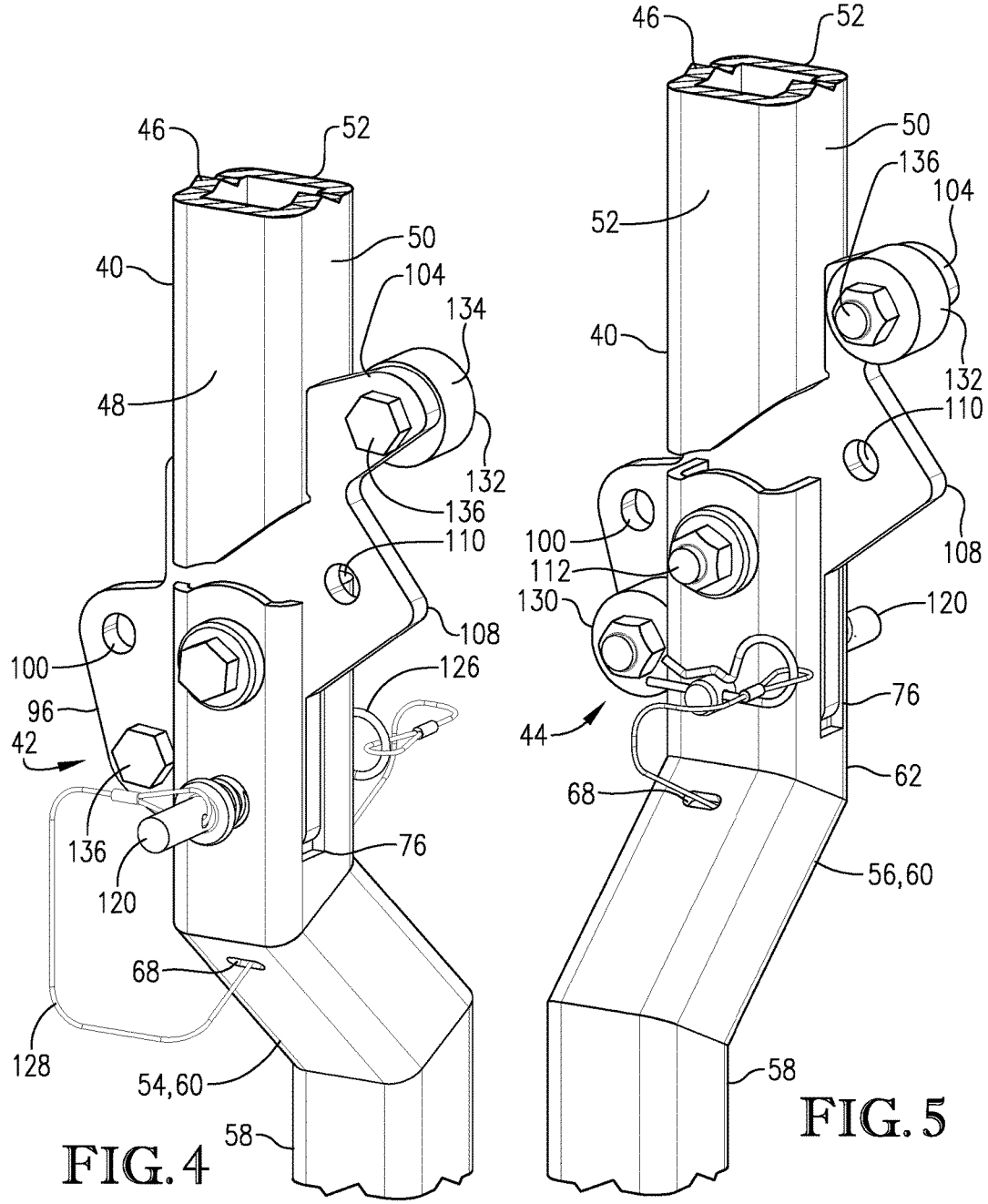

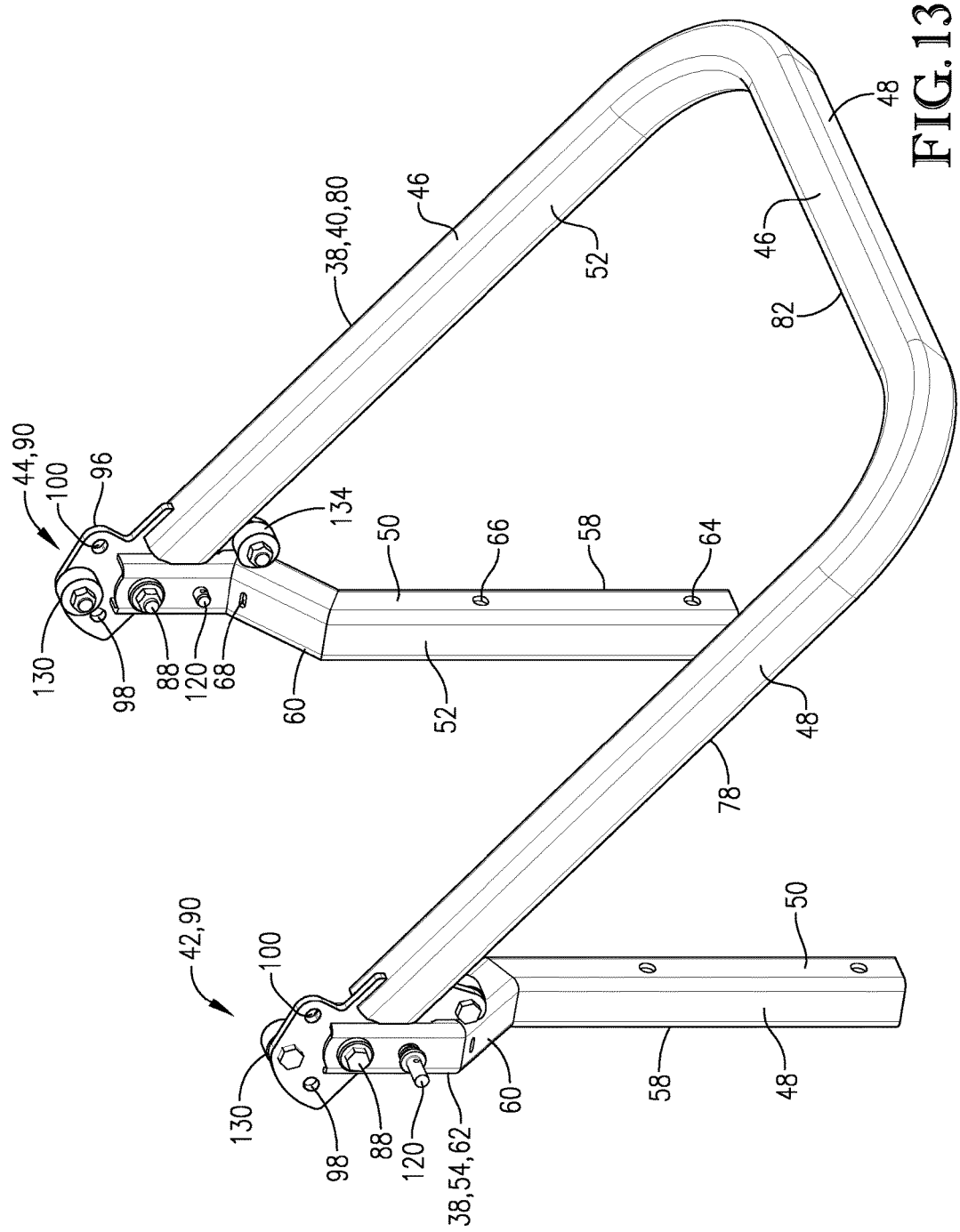

FORWARDLY AND REARWARDLY FOLDING ROLL-OVER PROTECTION STRUCTURE

RELATED APPLICATION

This application claims the benefit of U.S. Provisional Application Ser. No. 62/023,617 filed on Jul. 11, 2014 entitled FORWARDLY AND REARWARDLY FOLDING ROLL-OVER PROTECTION STRUCTURE, and U.S. Provisional Application Ser. No. 62/065,542 filed on Oct. 17, 2014 entitled FORWARDLY AND REARWARDLY FOLDING ROLL-OVER PROTECTION STRUCTURE, each of which is hereby incorporated in its entirety by reference herein.

BACKGROUND

1. Field

The present invention relates generally to folding roll-over protective structures (so-called "ROPS") of the type frequently used in connection with motorized riding vehicles such as lawnmowers, utility vehicles, and tractors. More specifically, embodiments of the present invention concern folding roll-over protective structures capable of releasable securement in rearward, upright, and forward configurations.

2. Discussion of Prior Art

A folding roll-over protection structure (hereinafter "ROPS") is commonly fitted to an agricultural, construction, or turf-care vehicle to reduce the risk of operator injury in a roll-over event. Prior art ROPS designs typically have one rearward folded position intended for use during transport, storage or vehicle operation around low obstructions such as trees. The unfolded upright position is intended to provide roll-over protection for the vehicle operator. Such limited configurations can be problematic. Vibration of the ROPS in each of its operational configurations is also a problem.

SUMMARY

The following brief summary is provided to indicate the nature of the subject matter disclosed herein. While certain aspects of the present invention are described below, the summary is not intended to limit the scope of the present invention.

Embodiments of the present invention provide a folding ROPS that does not suffer from the problems and limitations of the prior art folding ROPS.

A first aspect of the present invention concerns a foldable ROPS for a vehicle moveable in a generally fore-and-aft direction. The foldable ROPS comprises a frame including a base section and an upper section. The base section is connectable to the vehicle. The upper section is swingable relative to the base section between a forward position in which the upper section projects forwardly from the base section, a rearward position in which the upper section projects rearwardly from the base section, and an upright position positioned between the forward and rearward positions. A hinge assembly connects the sections of the frame. The hinge assembly is configured to releasably secure the upper section in each of the positions.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 4 is a fragmentary, enlarged, rear isometric view of the left side of the roll-over protection structure shown in FIG. 3, particularly showing the hinge assembly;

FIG. 5 is a fragmentary, enlarged, rear isometric view of the right side of the roll-over protection structure shown in FIG. 3, particularly showing the hinge assembly;

FIG. 13 is a rear isometric view of the roll-over protection structure illustrated in the rearward position;

Figure 1:
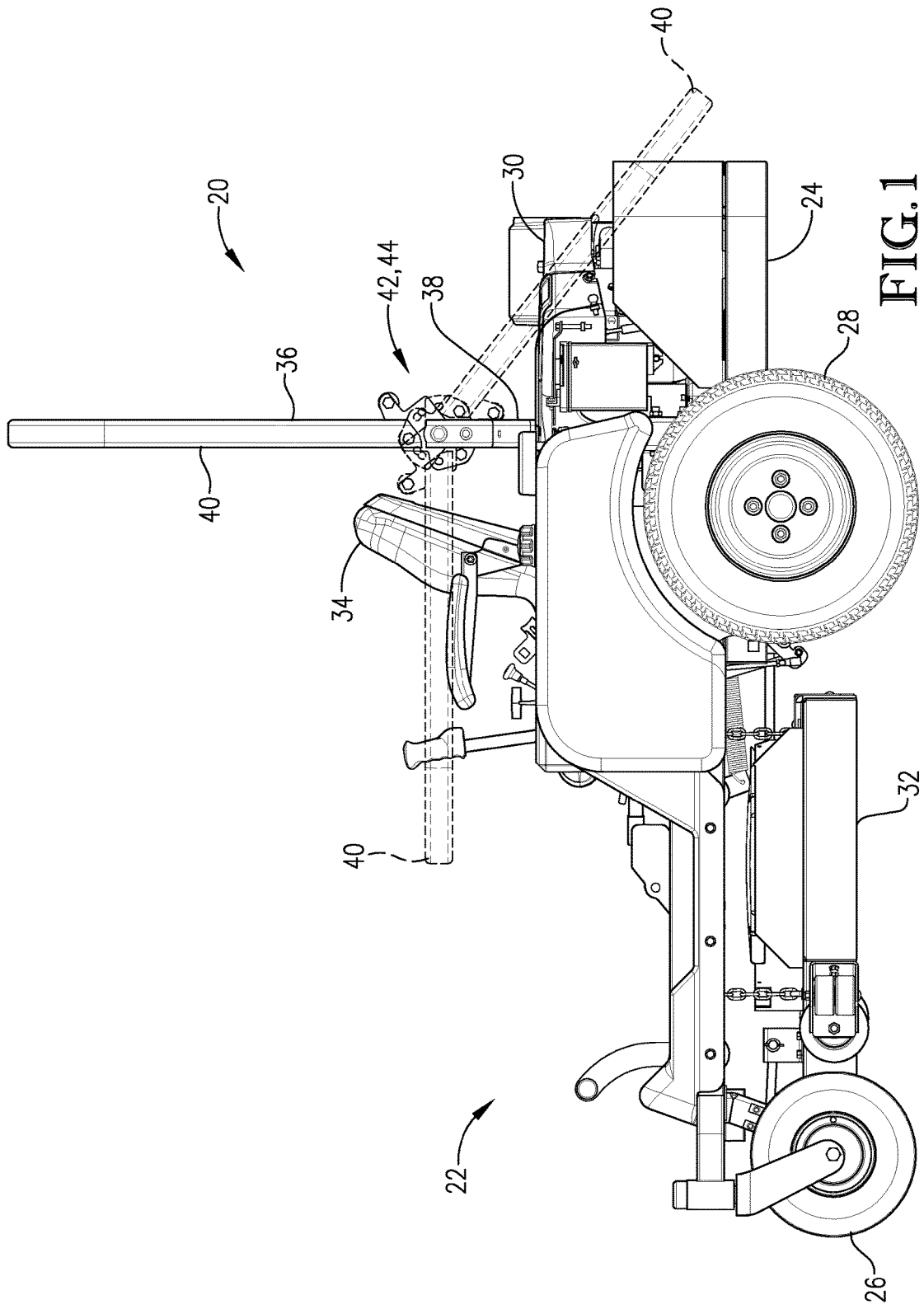
FIG. 1 is a side elevation view of a motorized riding vehicle having a folding roll-over protection structure constructed in accordance with a preferred embodiment of the present invention.
Figure 2:
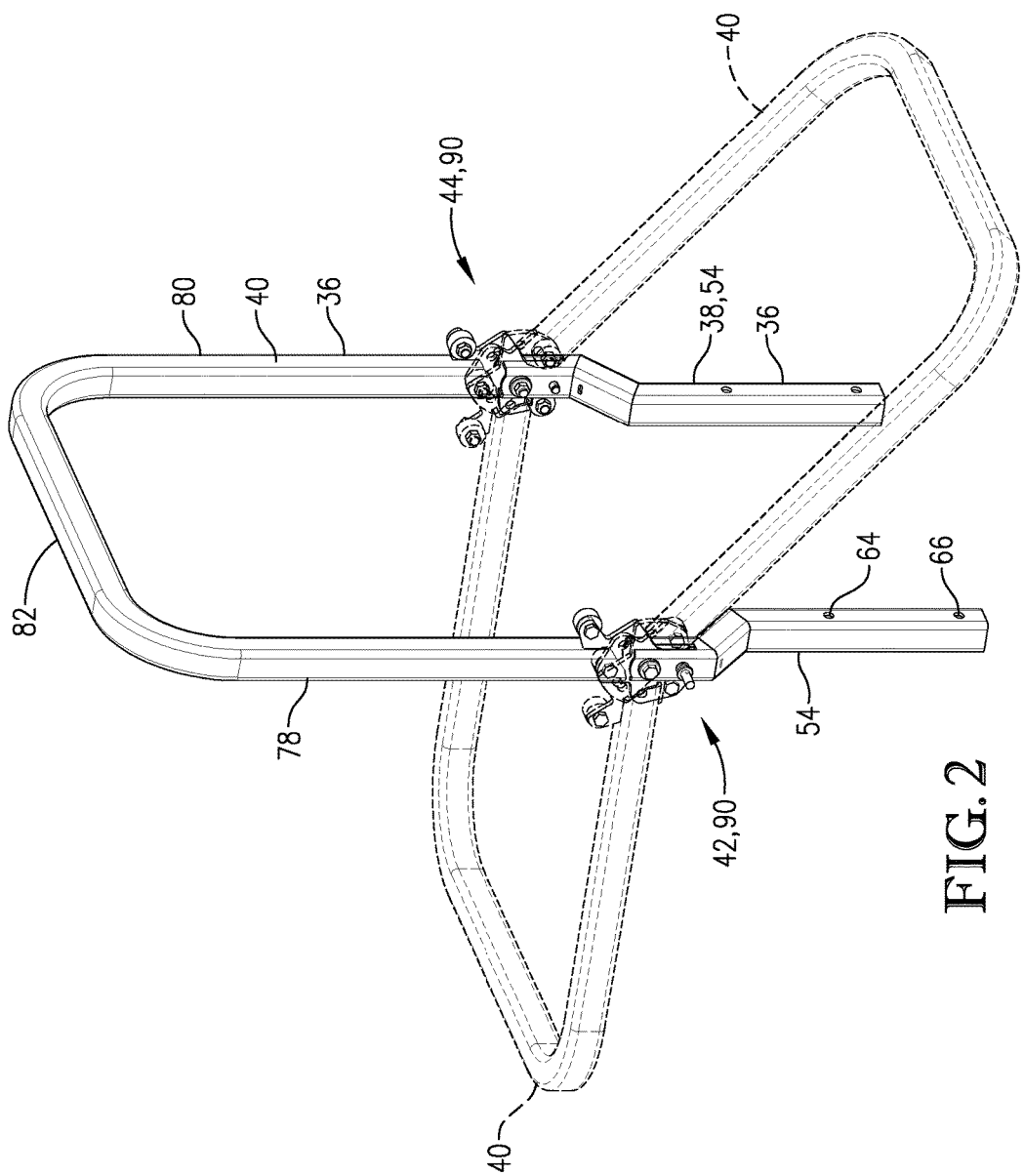
FIG. 2 is a rear isometric view of the roll-over protection structure as shown in FIG. 1, particularly illustrating the structure in the upright position in solid lines and in the forward and rearward position in broken lines.
Figure 3:
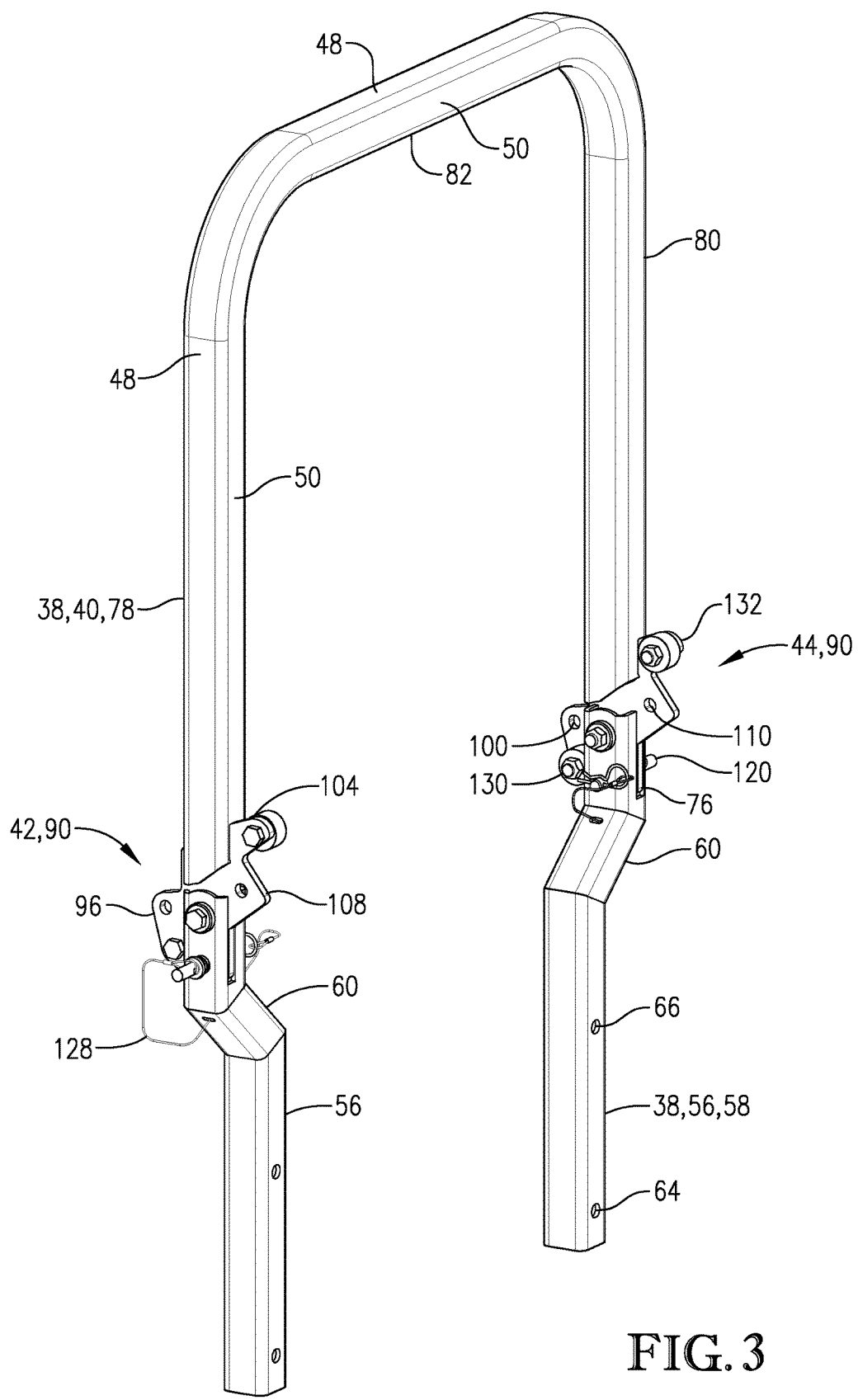
FIG. 3 is a rear isometric view of the roll-over protection structure illustrated in FIGS. 1 and 2, showing the structure in the upright position.
Figures 6, 7:
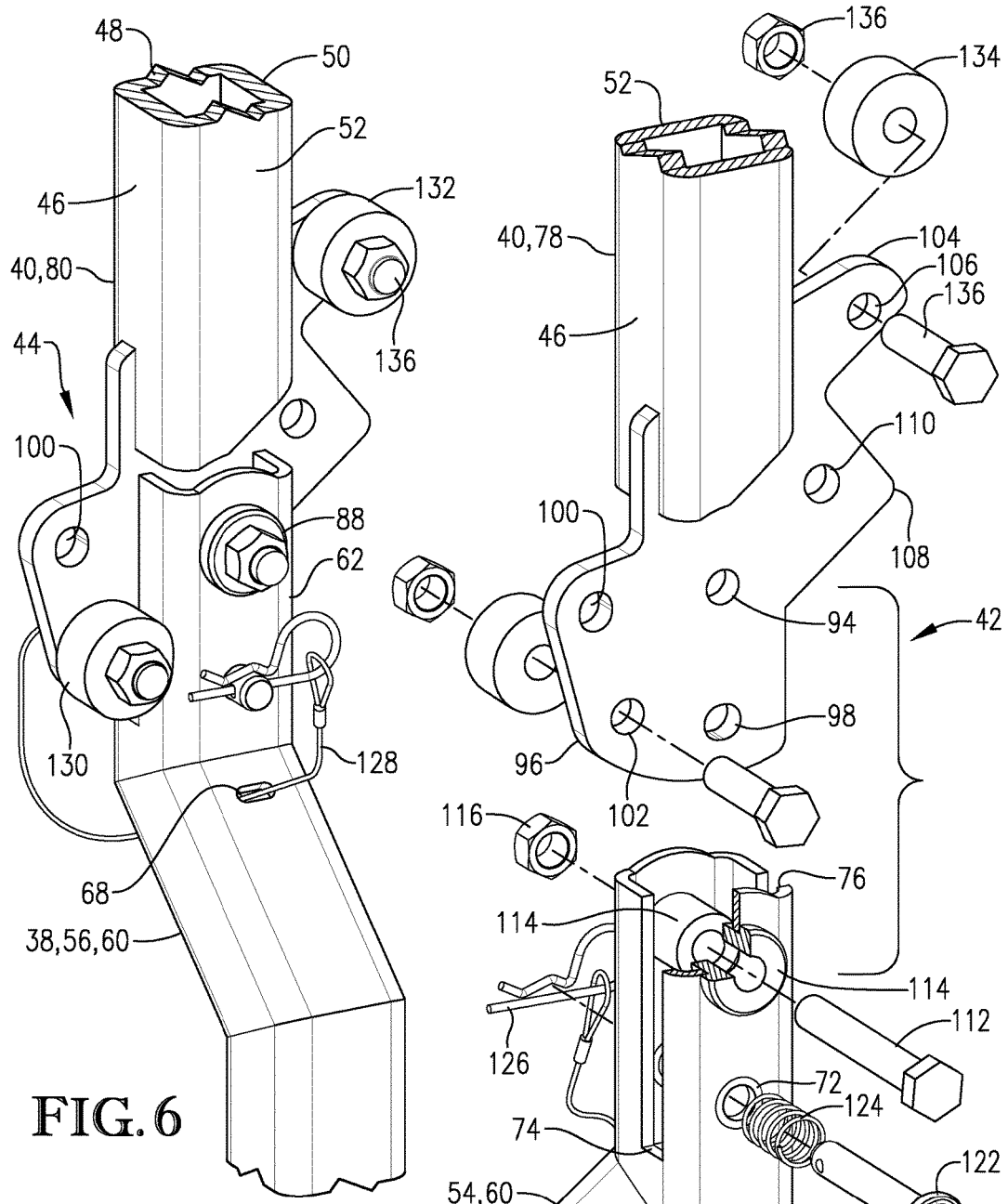
FIG. 6 is a fragmentary, enlarged isometric view of the right side of the roll-over protection structure generally opposite that shown in FIG. 5.
FIG. 7 is a fragmentary, exploded, enlarged isometric view of the left side of the roll-over protection structure generally opposite that shown in FIG. 4, particularly showing various components of the hinge assembly.
Figure 8:
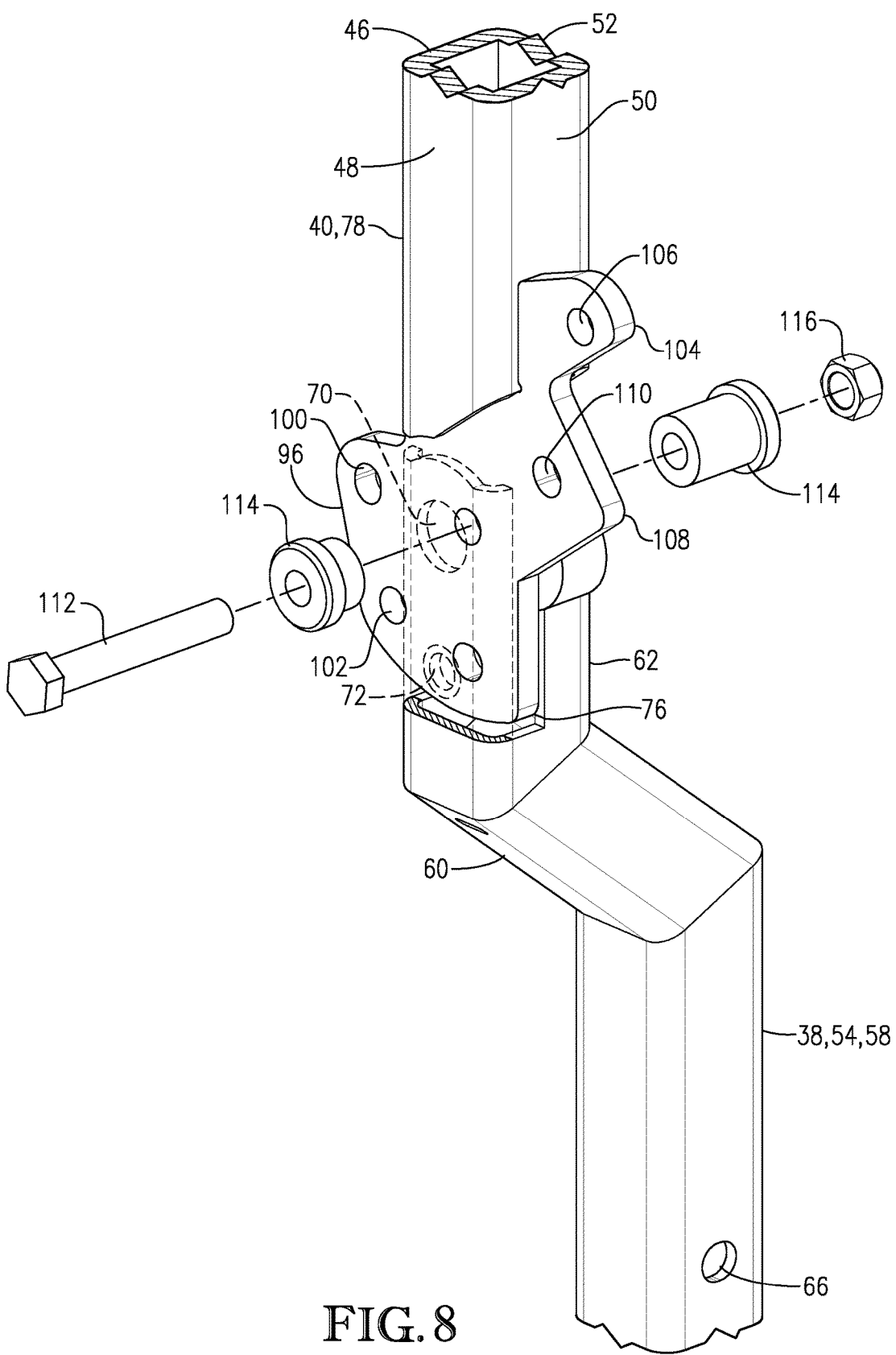
FIG. 8 is a fragmentary, exploded, rear isometric view of the left side of the roll-over protection structure similar to FIG. 4 but with the parts being removed to specifically show the position of the hinge plate.
Figure 9:
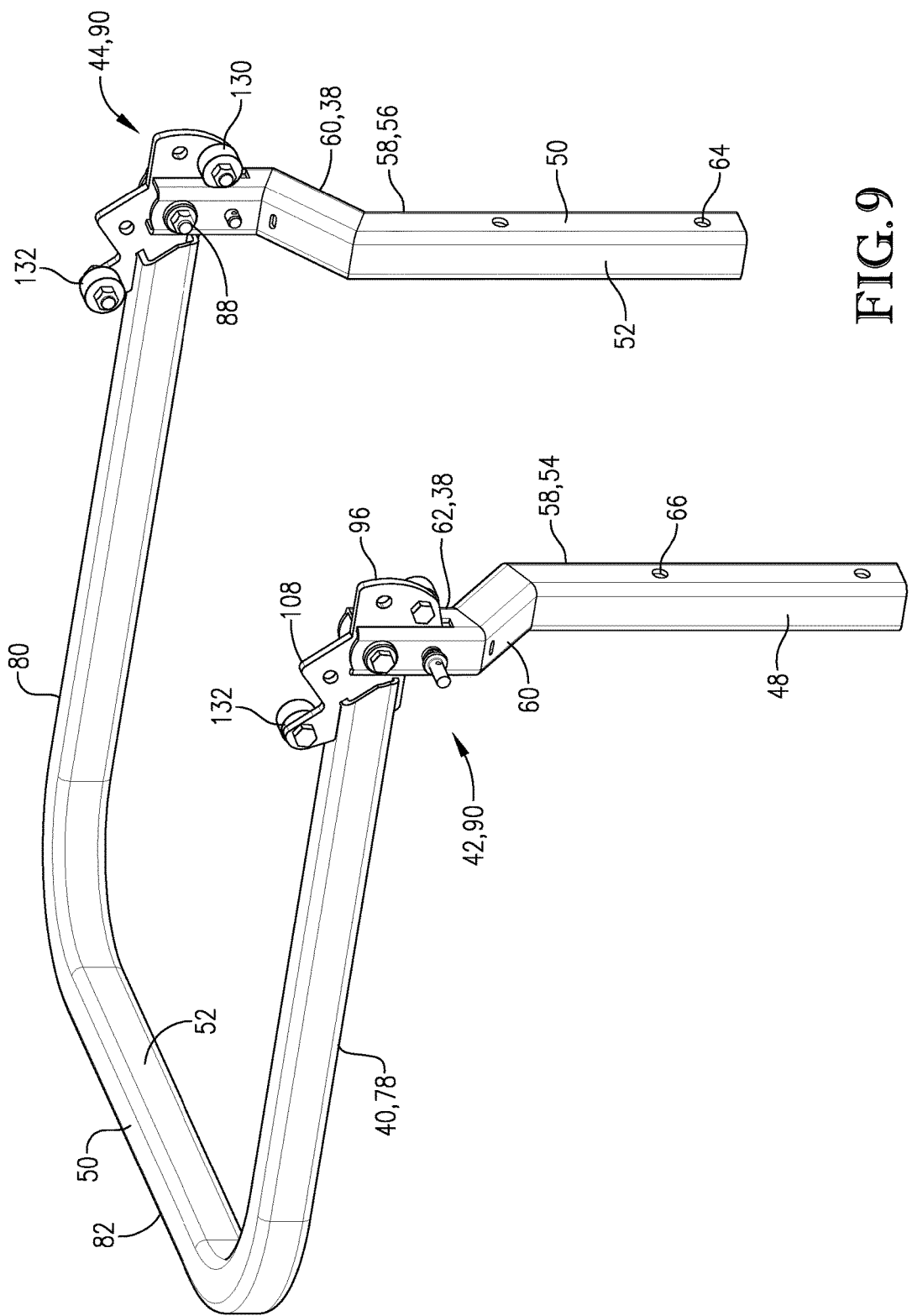
FIG. 9 is a rear isometric view of the roll-over protection structure illustrated in the forward position.
Figure 11:
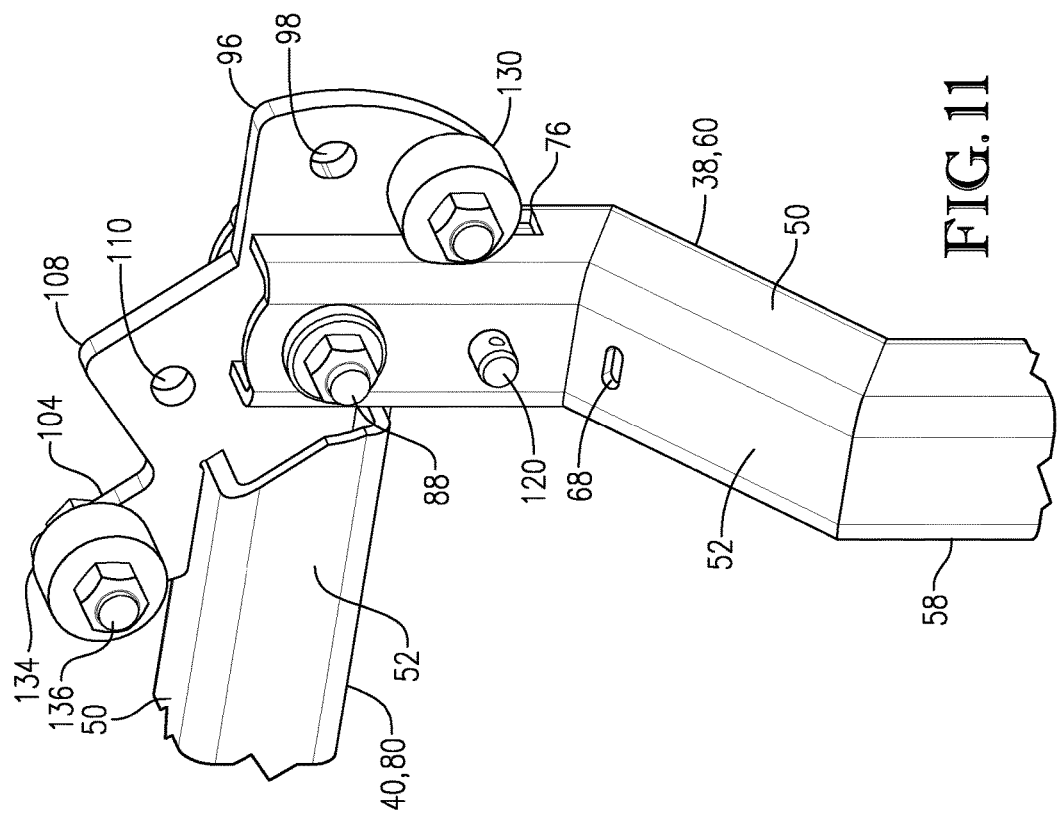
FIG. 11 is a fragmentary, enlarged, rear isometric view of the right side of the roll-over protection structure shown in FIG. 9, particularly depicting the hinge assembly.
Figure 10:
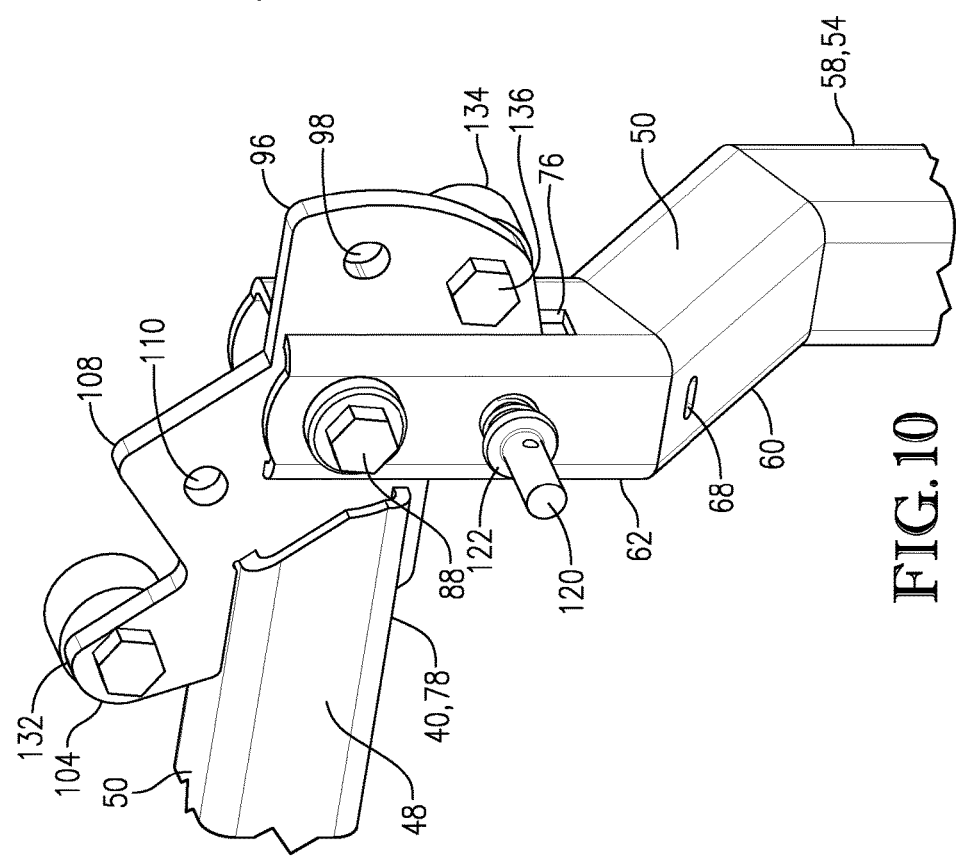
FIG. 10 is a fragmentary, enlarged, rear isometric view of the left side of the roll-over protection structure shown in FIG. 9, particularly illustrating the hinge assembly.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

The drawings show a foldable ROPS 20 in accordance with one embodiment of the present invention installed on a motorized vehicle 22 that is schematically illustrated as a lawnmower (see specifically FIG. 1). As is customary, the illustrated lawnmower 22 generally includes a frame 24, front wheels 26, rear wheels 28, an engine 30, a mower deck 32, and a seat for the operator 34. During operation of lawnmower 22, the operator (not shown) sits in seat 34. As will be described, ROPS 20 is connected to frame 24 adjacent seat 34 and extends vertically beyond seat 34 such that operator injury caused by a roll-over event and/or falling objects is reduced without significantly obstructing the operator's line of sight.

As will be apparent, the ROPS 20 is suitable for a wide variety of vehicle types having different constructions and is not limited to applications involving the depicted lawnmower 22. As will be discussed below, various structural features of ROPS 20 depicted in the illustrated embodiment may be altered to accommodate different vehicle types and shapes without departing from the ambit of the present invention.

The ROPS 20 generally includes a frame 36 having a base section 38 and an upper section 40, with the frame sections 38 and 40 being operably interconnected by a pair of hinge assemblies 42 and 44. The frame 36 and hinge assemblies 42 and 44 are preferably constructed from ROPS grade materials, with such materials being defined herein as any material capable of conforming, or intended to conform, to the standards established by the Occupational Safety & Health Administration. More particularly, the frame 36 and hinge assemblies 42 and 44 are preferably formed principally, if not entirely, of metal, such as stainless steel, low carbon steel, aluminum, etc.

In the illustrated embodiment, the frame 36 is constructed from tubular material, preferably steel, that has been formed into the desired shape. The preferred frame tubing has a substantially square transverse cross-section presenting four (4) integrally connected walls, including a front wall 46, an outside wall 48, a back wall 50, and an inside wall 52. It is to be understood however, that the principles of the present invention are equally applicable to ROPS frames having alternate cross-sectional shapes and constructions.

In the illustrated embodiment, the base section 38 is comprised of two spaced apart legs 54 and 56 that extend vertically from an attachment point (not shown) on the lawnmower frame 36. The legs 54 and 56 are essentially mirror images of one another and like components will therefore be similarly numbered in the figures. Each of the legs 54 and 56 comprises a bottom portion 58, a middle portion 60, and a top portion 62.

The bottom portion 58 includes a pair of spaced apart fastener receiving holes 64 and 66, one or both of which are used to secure the bottom portion 58 to the lawnmower frame 36. The illustrated bottom portion 58 comprises a straight vertical tube, with the holes 64 and 66 projecting therethrough in a fore-and-aft direction.

The middle portion 60 angles outwardly from the bottom portion 58 (the preferred angle being forty-five degrees). The preferred angular relationship of the middle portion 60 laterally offsets the top portion 62 relative to the bottom portion 58 such that the top of the frame 36 is wider than where it connects to the vehicle 22. Furthermore, the middle portion includes a transverse through-slot 68, for purposes which will be described.

The top portion 62 extends vertically from the middle portion 60. The top portion 62 is formed with fastener holes 70 and pin-receiving holes 72 that pass through the outside and inside walls (48 and 52) thereof. The top portion 62 of legs 54 or 56 also include a pair of opposed slots 74 and 76 formed into the front and back walls (46 and 50) thereof (see FIGS. 4-9). These features will be discussed in more detail below. The top portion 62 is also preferably shorter in length (or height) than the bottom portion 58.

The leg portions 58-62 are preferably welded together to form the individual legs 54 and 56, although other means for interconnecting the portions are within the ambit of the present invention. Base section 38 depicted in the illustrated embodiment is specifically configured to fit on the lawnmower depicted in FIG. 1. The depicted base section 38 can be altered to fit other vehicle types having various shapes and sizes without departing from the ambit of the present invention. For example, the base section of the present invention may be attached at various locations and by various attachment means without departing from the spirit of the present invention. Additionally, the base section of the present invention may have a substantially different shape and construction than that depicted in the illustrated embodiment and still be within the ambit of the present invention. Further, a base section comprising a single leg or more than two (2) legs is also within the ambit of the present invention.

In the illustrated embodiment, upper section 40 is constructed from a single piece of steel tubing having a generally U-shaped configuration. More particularly, the illustrated upper section 40 includes a pair of laterally spaced apart vertical arms 78 and 80 and a central horizontal bight 82 interconnecting the arms 78 and 80. The arms 78 and 80 preferably align with the top portion 62 of legs 54 and 56, respectively, of the base section 38. It will be appreciated that the construction of the upper section 40 may be varied without departing from the spirit of the present invention. For example, it is within the ambit of the present invention for the arms to be disconnected rather than joined at their upper ends. The shape of each portion (i.e. arms and bight) of the upper section, as well as the overall shape of the upper section itself, may also be varied without departing from the spirit of the present invention.

Figure 12:
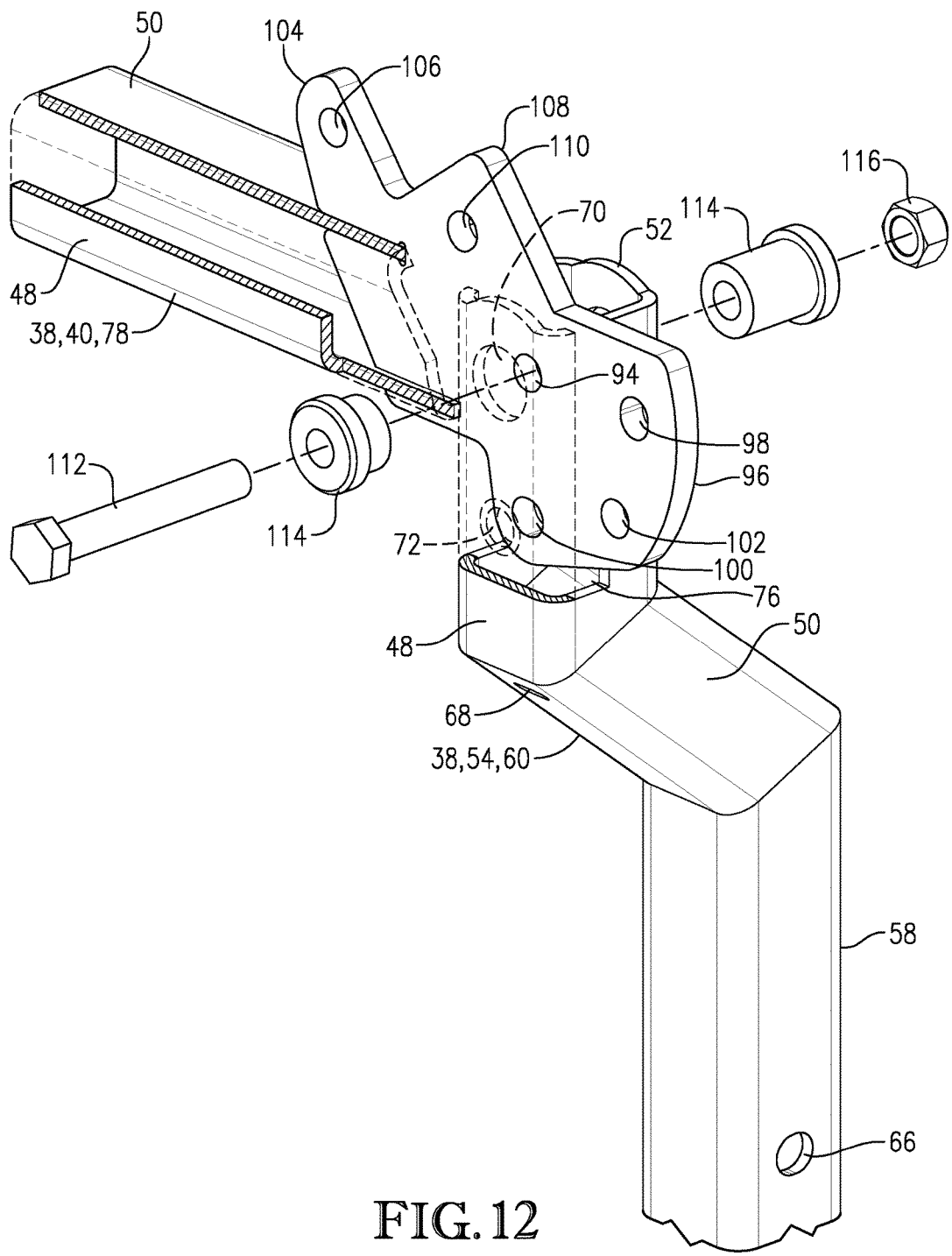
FIG. 12 is a fragmentary, exploded, rear isometric view of the left side of the roll-over protection structure similar to that shown in FIG. 10, but with parts being remove to specifically show the position of the hinge plate.
Figure 15:
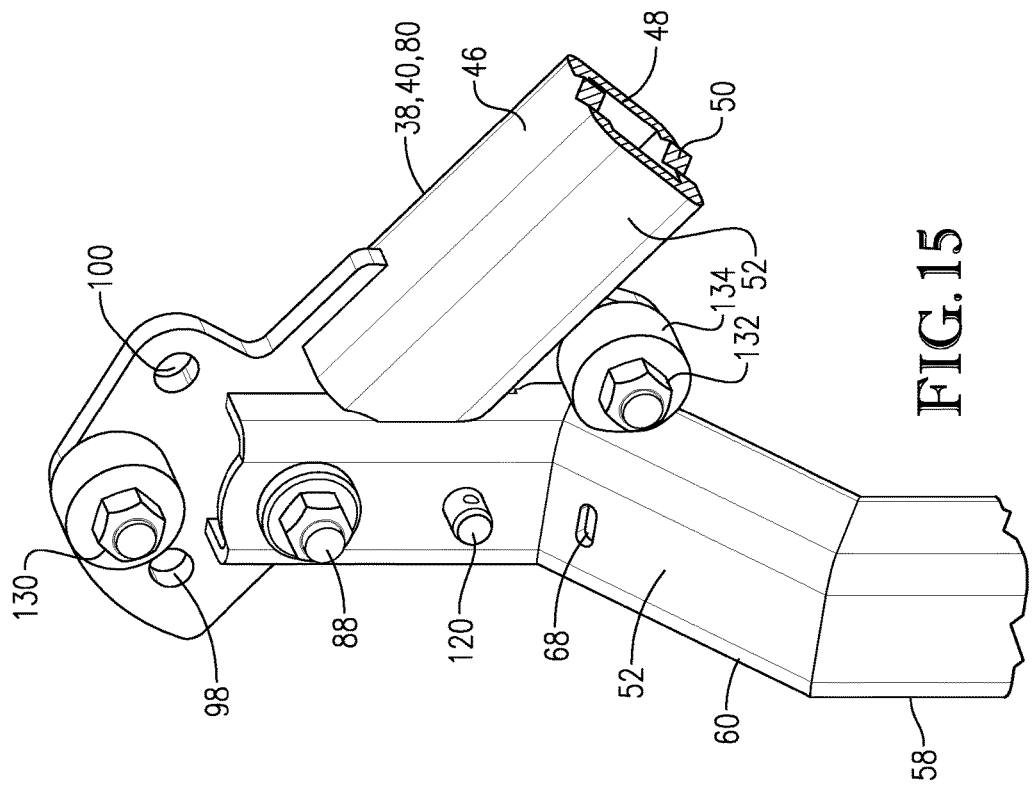
FIG. 15 is a fragmentary, enlarged, rear isometric view of the right side of the roll-over protection structure shown in FIG. 13, particularly depicting the hinge assembly.
Figure 14:
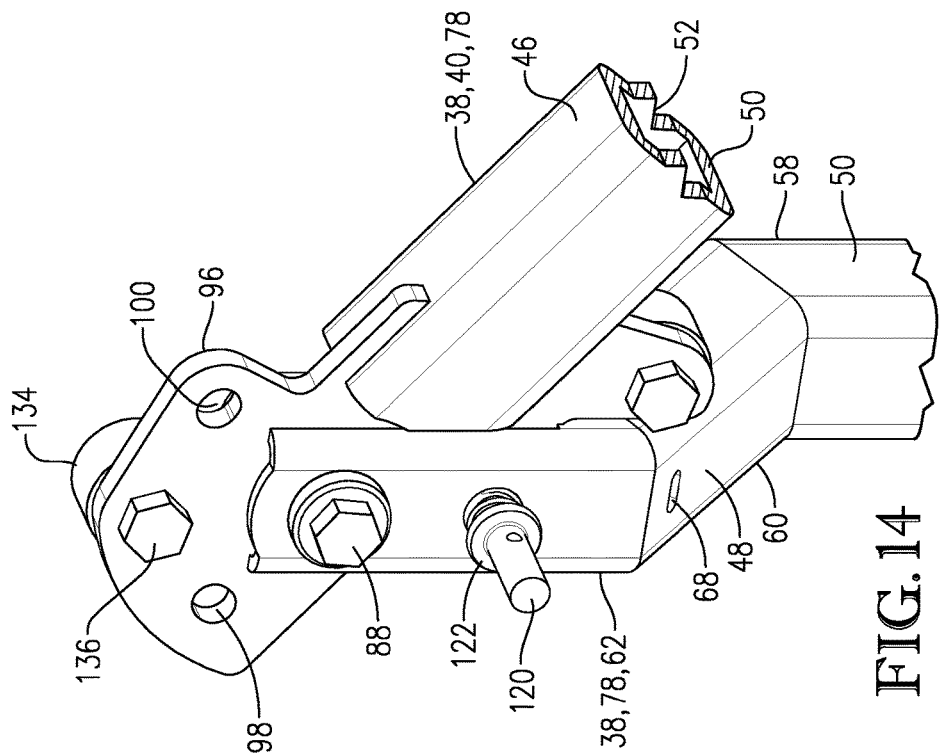
FIG. 14 is a fragmentary, enlarged, rear isometric view of the left side of the roll-over protection structure shown in FIG. 13, particularly illustrating the hinge assembly.

As will be discussed in more detail below, projecting from the lower end of each arm 78 and 80 is slot 84 formed into the front wall 46 thereof to facilitate attachment of respective hinge assembly 42 or 44 (see FIG. 12).

Because the base section 38 of the illustrated frame 36 includes a pair of discrete spaced apart legs 54 and 56, the ROPS 20 includes the pair of hinge assemblies 42 and 44, each associated with a respective one of the legs 54 and 56. The principles of the present invention are equally applicable to an alternative ROPS having a single hinge assembly. For example, if the frame sections are joined at a single connection (e.g., where the base section includes only one leg), the alternative ROPS assembly may include only one hinge assembly.

In the illustrated embodiment, the hinge assemblies 42 and 44 are virtually mirror images of one another and for the sake of brevity, the description will focus on just one hinge assembly, with the components being similarly numbered. Each hinge assembly 42 or 44 is generally comprises a hinge plate 86, a fastener assembly 88, and a lock assembly 90. The hinge plate 86 is preferably formed from a piece of metal plate stock. More preferably, hinge plate 86 is formed from a piece of plate steel having a thickness of about three-tenths (0.3) of an inch, although other suitable materials and thicknesses are within the ambit of the present invention. Perhaps best shown in FIGS. 7 and 12, the hinge plate 86 is preferably fixed to the respective upper arm 78 or 80 of the upper frame section 40. Particularly, the plate 86 includes a slot 92 received on the back wall 50 of the corresponding arm 78 or 80. The lowermost slot 84 in the arm 78 or 80 similarly receives the hinge plate 86. This interlocking interconnection aligns the hinge plate 86 in the fore-and-aft direction and provides joining interfaces along which the hinge plate 86 and the corresponding arm 78 or 80 are attached. Preferably, a weld seam is provided along each such interface, such that the hinge plate 86 is fixed to the corresponding arm 78 or 80 for swinging movement therewith.

It should be further understood that the attachment of hinge plate to the sections may be reversed without departing from the spirit of the present invention. That is, principles of the present invention are equally applicable to the hinge plate being rigidly attached to the base section and swingably attached to the upper section. Additionally, the hinge plate may be rigidly attached to one of the sections by a means other than welding without departing from the spirit of the present invention.

The hinge plate 86 is uniquely configured to provide connection with the corresponding leg 54 or 56 of the base frame section 38, support vibration dampeners (as will be described), and function as part of the lock assembly 90. The slots 74 and 76 in the top portion 62 of the corresponding leg 54 or 56 receives the hinge plate 86 as it rotates to its various positions corresponding with the location of the upper frame section 40. More particularly, a central pivot opening 94 generally aligns with the hole 70 in the top portion 62 of the corresponding leg 54 or 56. An enlarged base 96 of the hinge plate 86 presents a pair of pin-receiving openings 98 and 100 and support-receiving opening 102 located generally therebetween. The plate 86 also presents an uppermost tang 104 that projects rearwardly from the back wall 50 of the corresponding arm 78 or 80. A support-receiving opening 106 is defined in the tang 104. An intermediate projection 108 also projects rearwardly relative to the corresponding arm 78 or 80 and presents a pin-receiving opening 110. The purpose and function of each opening in the hinge plate 86 will be described further below.

Although the illustrated hinge plate 86 design is preferred, the principles of the present invention are applicable to alternative hinge plate configurations or to elimination of the hinge plate altogether. For example, each arm may alternatively be directly pivotally connected to the corresponding leg.

In the illustrated embodiment, fastener assembly 88 includes a pivot element preferably comprising the following components: a bolt 112, a split bushing 114, and a lock nut 116. The bolt 112 passes through the aligned pivot opening 94 in the hinge plate 86 and the fastener holes 70 in the top portion 62 of corresponding leg 54 or 56 (see FIGS. 7, 8, 12, and 15). The lock nut 116 secures the bolt 112 in place. The split bushing 114 is interposed between the bolt 112 and the oversized fastener holes 70 in the top portion 62. Furthermore, the bushing 114 rotatably receives the shaft of the bolt 112 and thereby serves to permit swinging of the hinge plate 86 and corresponding arm 78 or 80 relative to the respective leg 54 or 56. In this respect, the bolt 112 may be snugly received within the pivot opening 94 of the hinge plate 86, although relative rotation between the bolt 112 and hinge plate 86 may be provided if desired. Furthermore, the bushing 114 preferably does not rotate relative to the corresponding leg 54 or 56, although certain aspects of the present invention would encompass such relative rotation. It should be understood that various other means of swingably fastening the hinge plate to the base section are within the ambit of the present invention. For example, fastener assembly 88 may be alternatively constructed without departing from the spirit of the present invention.

In the illustrated embodiment, the lock assembly 90 includes the pin-receiving openings 98, 100, and 110 in the hinge plate, the pin receiving hole 72 in the top portion 62 of the corresponding leg 54 or 56 of the base frame section 38, and a lock member 118. The lock member 118 preferably includes a pin 120 removably received in the pin-receiving hole 72 and one of the aligned pin-receiving openings of the hinge plate 86, as will be described. The pin 120 preferably includes collar 122 and a compression spring 124 positioned between the collar 122 and the outside wall 48 of the top portion 62 of the corresponding leg 54 or 56. The spring 124 yieldably urges the pin 120 out of pin-receiving hole 72 so as to facilitate unlocking of the lock assembly 90. A retention clip 126, preferably in the form of a cotter pin, is removably received on the end of the pin 120 opposite the collar 122. The clip 126 serves to prevent unintended removal of the pin 120 and therefore unlocking of the lock assembly 90. A tether 128 is preferably provided for preventing misplacement of the clip 126. In the illustrated embodiment, one end of the tether 128 is secured to the pin 120 (adjacent the collar 122) and the opposite end is secured to the clip 126. The tether 128 is preferably received in the through-slot 68 defined in the middle portion of the corresponding leg.

Figure 16:
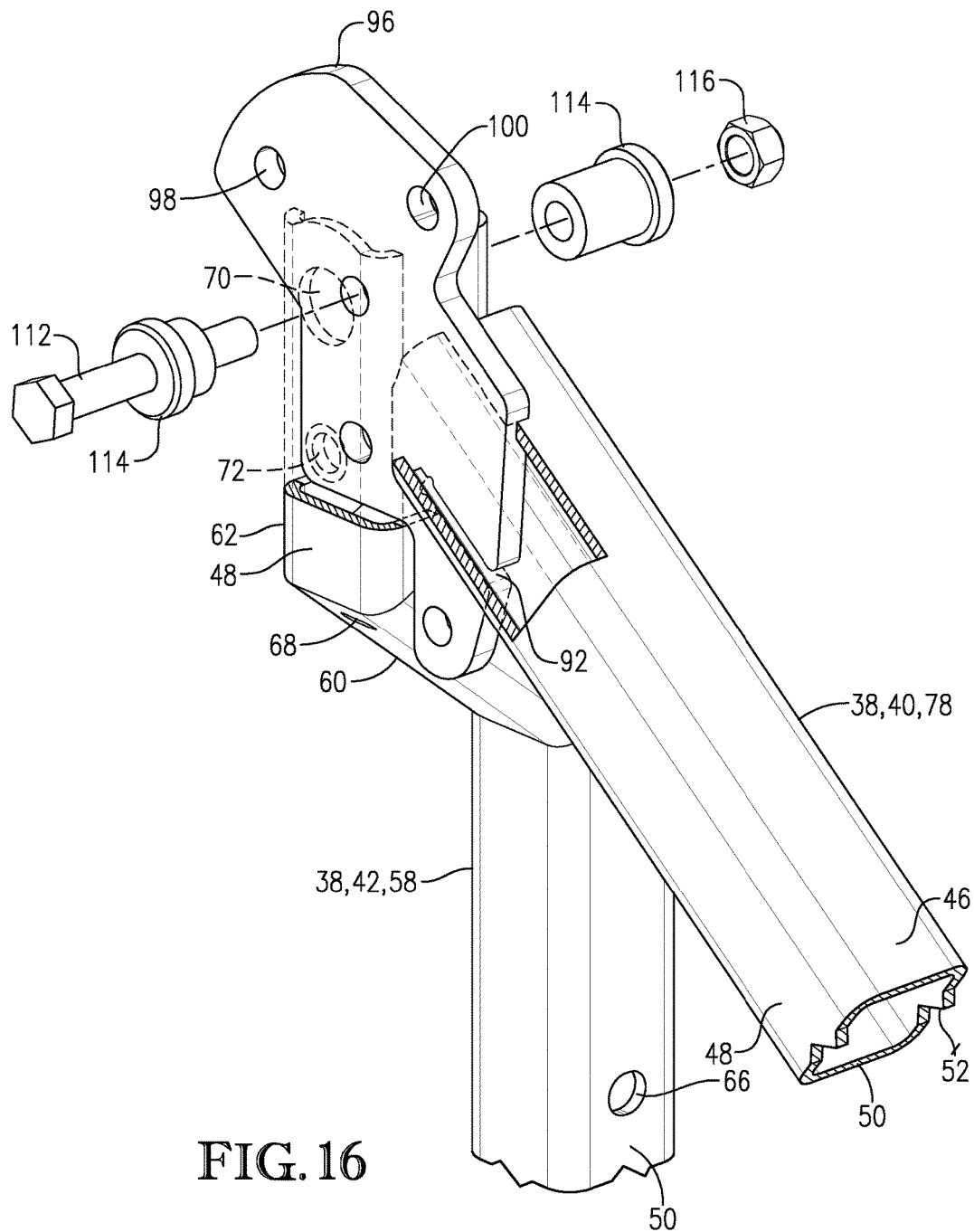
FIG. 16 is a fragmentary, exploded, rear isometric view of the left side of the roll-over protection structure similar to FIG. 14, but with the parts being removed to specifically show the position of the hinge plate.

Again, the base 102 of the hinge plate 86 is disposed within the opposed slots 74 and 76 of the corresponding top portion 62. As the upper frame section 40 is located in its respective operating positions, a corresponding pin-receiving opening in the hinge plate 86 aligns with the pin-receiving hole 72 in the corresponding top portion 62. More particularly, with the illustrated ROPS 20, the upper frame section 40 is positioned in three (3) discrete operating positions—the upright position (FIGS. 3-8), the forward position (FIGS. 9-12), and the rearward position (FIGS. 13-16); although additional operating positions may be provided if desired. In the upright position of the upper frame section 40, the pin-receiving opening 98 is aligned with the pin-receiving hole 72 (e.g., see FIG. 8). In the forward position of the upper frame section 40, the pin-receiving opening 100 is aligned with the pin-receiving hole 72 (e.g., see FIG. 12). In the rearward position of the upper frame section 40, the pin-receiving opening 110 is aligned with the pin-receiving hole 72 (e.g., see FIG. 16). In each of the positions of the upper frame section 40, the lock assembly 90 is placed in a locked condition to releasably secure the upper frame section 40 in that position by inserting the pin 120 into the aligned pin-receiving hole 72 and corresponding pin-receiving opening. The clip 126 serves to prevent inadvertent unlocking of the assembly 90. When it is desired to shift the upper frame section 40 to a different position, the clip 126 is removed from the pin 120 and the pin 120 is pulled outwardly to at least disengage the hinge plate 86. Such removal is facilitated by the spring 124. The upper frame section 40, and thereby the hinge plate 86, swing until a different pin-receiving opening is aligned with the pin-receiving hole 72. The pin is then reinserted to place the lock assembly 90 in the locked condition. It should be understood that the lock assembly of the present invention is not limited to lock assembly 90 depicted in the illustrated embodiment.

It is further noted that, when the upper section 40 is located in the upright position, base section 38 and upper section 40 are preferably inline, with an angle therebetween being about one hundred eighty degrees (180°) (see FIGS. 1-8). When the upper section 40 is located in the forward position, the base section 38 and the upper section 40 preferably define an interior angle therebetween of about ninety degrees (90°) (see FIGS. 9-12). When the upper section 40 is located in the rearward position, the base section 38 and the upper section 40 preferably define an interior angle therebetween of about fifty-two (52°) (see FIGS. 13-16). It will be apparent, however, that the positions of the frame sections 38 and 40 in each of the operating positions may be varied to some degree without departing from the spirit of the present invention. For example, it is not required for the base section to be fixed in a vertical orientation. Furthermore, the portion of the upper frame section relative to the base section in each operational position may be varied by as much as twenty degrees (20°) in either direction. It is noted, however, that the illustrated forward position of the upper frame section 40 is particularly useful when shipping the vehicle 22 with ROPS 20 assembled thereto in a low-profile, enclosed crate.

The ROPS 20 preferably also includes resilient vibration dampeners 130 and 132 associated with each hinge assembly 42 and 44 to restrict relative vibrational movement of the frame and the hinge assembly. (The illustrated pairs of dampeners 130 and 132 associated with each hinge plate 86 are identical in configuration and the description will therefore refer to the pairs interchangeably.) In the illustrated embodiment, the dampeners 130 and 132 serve to dampen vibration when the upper frame section 40 is secured in each of the operating positions. The dampeners 130 and 132 are similarly constructed and therefore like components will be similarly numbered. In the illustrated embodiment, each dampener 130 or 132 includes a compressible cushion 134 supported on the hinge plate 86 by a nut-and-bolt assembly 136. As will be described, each dampener 130 or 132 is configured to compressibly engage the corresponding leg 54 or 56 of the base section 38 when the upper frame section 40 is secured in one of the operating positions. More particularly, as perhaps best shown in FIGS. 6 and 7, when the upper frame section 40 is in one of the operating positions (such as the upright position shown in these figures), the space between the shaft of the nut-and-bolt assembly 136 and the front wall of the corresponding leg 54 or 56 is less than the radial dimension (measured radially from the inside diameter to the outside diameter) of the cushion 134. This causes the cushion 134 to be resiliently deformed, and maintains a vibration reducing force on the components. Specifically, the compressed cushion 134 yieldably urges the upper frame section 40 rearwardly; however, such movement is prevented by the locking assembly 90. These counteracting forces retain the ROPS 20 firmly in the upright configuration and eliminates vibration that might be caused by tolerances or slop, particularly at the connection points between components. Compressible cushion 134 is constructed from a compressible material, such as polyurethane or another material having comparable elasticity.

In the illustrated embodiment, the dampener 132 is attached to the tang 104 of the hinge plate 86 by passing the shaft of the nut-and-bolt assembly 136 through the support-receiving opening 106. The dampener 130 is removably supported on the hinge plate 86 at the support-receiving opening 102, for purposes which will be described.

It will be appreciated, however, for the resilient vibration dampeners to be alternatively constructed without departing from the ambit of the present invention. For example, the cushion support need not comprise a nut-and-bolt assembly, but rather a simple peg or stub shaft (both not shown) attached to the hinge plate may alternatively be used. Furthermore, the dampeners need not be supported on the hinge plate. For example, the dampener may be directly coupled between each arm and corresponding leg. Yet further, the dampeners need not be resiliently compressed. Instead, it is entirely within the ambit of the present invention for one or more or all of the dampeners to be resiliently stretched. For example, elastic bands may alternatively be operably coupled between the frame sections to reduce vibration. The number and location of the dampeners may also be altered without departing from the spirt of the present invention.

Again, when the upper frame section 40 is in the upright position (see FIGS. 3-8), the dampener 130 on the base 96 of the hinge plate 86 serves to reduce vibration of the ROPS 20. More particularly, the cushion 134 of the dampener 130 compressibly engages the front wall 46 of the top portion 62 of the corresponding leg 54 or 56. When it is desired to swing the upper frame section 40 to the forward position (shown in FIGS. 9-12), in addition to unlocking the lock assembly 90, the illustrated embodiment requires the dampener 130 to be removed. This is accomplished simply by disassembling the nut-and-bolt assembly 136 of the dampener 130 and removing the dampener 130. Once the support-receiving opening 102 in the hinge plate 86 is positioned on the opposite (i.e., rear) side of the corresponding leg 54 or 56, the dampener 130 is reattached to the hinge plate 86. The upper frame section 40 is then forced into the forward position, causing the cushion 134 of the dampener 130 to compress against the back wall 50 of the top portion 62, and the locking assembly 90 is then positioned in the locked condition. Because of the added steps required to swing the upper frame section 40 to the forward position, the operator is essentially prevented from doing so during operation of the vehicle 22, which provides added safety to the ROPS. On the other hand, if it desired to move the upper frame section 40 from the upright position to the rearward position (see FIGS. 13-16), the locking assembly 90 is unlocked and the dampener 130 is forced into compressive engagement with the back wall 50 of the top portion 62. Of course, repositioning of the upper frame section 40 from the rearward position to the forward position, or vice versa, will require removal and re-attachment of the dampener 130.

The lock assembly 90 may be fitted with additional means of vibration reduction. In the illustrated embodiment, locking pin 120 is fitted with spring 124 to reduce movement of the locking pin 120 when positioned in the locked condition. Various coatings known to those having skill in the art may also be applied to areas prone to vibration.

The ROPS is preferably in the upright position during operation of the vehicle. When the ROPS is in the upright configuration, the upper section extends vertically to a point beyond the height of an operator seated in the vehicle. If a roll-over event occurs when the ROPS is in the upright configuration, the ROPS provides protection to the operator. Additionally, when the ROPS is in the upright configuration, the ROPS reduces the risk of operator injury from falling and overhanging objects. The folding action of the ROPS to a forward or rearward position allows the vehicle fitted with the ROPS to be stored in a wider variety of locations of limited space.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A foldable roll-over protection structure for a vehicle moveable in a generally fore-and-aft direction, said foldable rollover protection structure comprising:
    a frame including a base section and an upper section,
    said base section being connectable to the vehicle,
    said upper section being swingable relative to the base section between a forward position in which the upper section projects forwardly from the base section, a rearward position in which upper section projects rearwardly from the base section, and an upright position positioned between the forward and rearward positions;
    a hinge assembly swingably interconnecting the sections of the frame,
    said hinge assembly being configured to releasably secure the upper section in each of said positions;
    a resilient vibration dampener operably coupled between the sections of the frame,
    said vibration dampener being resiliently deformed when the upper section is in at least one of said positions, such that relative vibrational movement between the sections of the frame is restricted,
    said vibration dampener being configured to dampen relative vibrational movement between the frame sections when the upper section is in multiple ones of said positions,
    said vibration dampener being configured to dampen relative vibrational movement between the frame sections when the upper section is in either one of a pair of said positions; and
    a second resilient vibration dampener configured to dampen relative vibrational movement between the frame sections when the upper section is in a third one of said positions,
    said vibration dampener being removably coupled to the hinge assembly,
    said vibration dampener being removed when the upper section is moved between said pair of said positions,
    said hinge assembly including a hinge plate fixed to a first one of the frame sections,
    said vibration dampener including a fastener removably secured to the hinge plate,
    said vibration dampener further including a compressible cushion supported on the fastener, with the cushion being compressed by a second one of the frame sections when the upper section is in either one of said pair of said positions.

2. The foldable roll-over protection structure as claimed in claim 1,
    said pair of said positions comprising the forward and upright positions,
    said third one of said positions comprising the rearward position.

3. A foldable roll-over protection structure for a vehicle moveable in a generally fore-and-aft direction, said foldable rollover protection structure comprising:
    a frame including a base section and an upper section,
    said base section being connectable to the vehicle,
    said upper section being swingable relative to the base section between a forward position in which the upper section projects forwardly from the base section, a rearward position in which upper section projects rearwardly from the base section, and an upright position positioned between the forward and rearward positions;
    a hinge assembly swingably interconnecting the sections of the frame,
    said hinge assembly being configured to releasably secure the upper section in each of said positions; and
    a resilient vibration dampener operably coupled between the sections of the frame,
    said vibration dampener being resiliently deformed when the upper section is in at least one of said positions, such that relative vibrational movement between the sections of the frame is restricted,
    said hinge assembly including a lock assembly removably positionable in a locked condition, in which the lock assembly is operably interconnected between the frame sections to releasably secure the upper section in each of said positions,
    said lock assembly and said vibration dampener being configured and arranged so that the vibration dampener is resiliently deformed when the lock assembly is in the locked condition,
    said hinge assembly including a hinge plate fixed to a first one of the frame sections,
    said lock assembly including a removable pin, a plurality of spaced apart pin-receiving openings in the hinge plate, and a pin-receiving hole defined in a second one of the frame sections,
    said lock assembly being in the locked condition to releasably lock the upper section in one of said positions when the pin is received in the hole and a corresponding one of the openings,
    said vibration dampener including a compressible cushion fixed relative to the first one of the frame sections and compressed by the second one of the frame sections when the upper frame section is in said at least one of said positions,
    said vibration dampener including a cushion support fixed relative to the first one of the frame sections, with the compressible cushion being supported on the support,
    said support being spaced from the second one of the frame sections a first dimension when the lock is in the locked condition,
    said compressible cushion presenting a section located between the support and the second one of the frame sections,
    said section of the compressible cushion presenting a second dimension that is greater than the first dimension, such that the section is resiliently compressed when lock assembly is in the locked condition,
    said cushion support comprising a fastener removably secured to the hinge plate.

4. The foldable roll-over protection structure as claimed in claim 1,
    said hinge assembly including a lock assembly removably positionable in a locked condition, in which the lock assembly is operably interconnected between the frame sections to releasably secure the upper section in each of said positions, said lock assembly and said vibration dampener being configured and arranged so that the vibration dampener is resiliently deformed when the lock assembly is in the locked condition.

5. The foldable roll-over protection structure as claimed in claim 4, said lock assembly including a removable pin, a plurality of spaced apart pin-receiving openings in the hinge plate, and a pin-receiving hole defined in a second one of the frame sections, said lock assembly being in the locked condition to releasably lock the upper section in one of said positions when the pin is received in the hole and a corresponding one of the openings.

6. The foldable roll-over protection structure as claimed in claim 1, said vibration dampener including a cushion support fixed relative to the first one of the frame sections, with the compressible cushion being supported on the support, said support being spaced from the second one of the frame sections a first dimension when the lock is in the locked condition, said compressible cushion presenting a section located between the support and the second one of the frame sections, said section of the compressible cushion presenting a second dimension that is greater than the first dimension, such that the section is resiliently compressed when lock assembly is in the locked condition.

7. The foldable roll-over protection structure as claimed in claim 1, said hinge assembly including a lock assembly removably positionable in a locked condition, in which the lock assembly is operably interconnected between the sections of the frame to releasably secure the upper section in each of said positions, said lock assembly including a removable pin, a plurality of spaced apart pin-receiving openings in the hinge plate, and a pin-receiving hole defined in a second one of the frame sections, said lock assembly being in the locked condition to releasably lock the upper section in one of said positions when the pin is received in the hole and a corresponding one of the openings.

8. The foldable roll-over protection structure as claimed in claim 1, said upper and base sections defining an interior angle therebetween of about ninety degrees when the upper section is in the forward position.

9. The foldable roll-over protection structure as claimed in claim 8, said upper and base sections defining an interior angle therebetween of about fifty-eight degrees when the upper section is in the rearward position.

10. The foldable roll-over protection structure as claimed in claim 1, said base section including a pair of laterally spaced apart upright legs.

11. The foldable roll-over protection structure as claimed in claim 10, said upper section having a generally u-shaped construction, said hinge assembly including a pair of pivot elements, each swingably interconnecting the upper section to a respective one of the upright legs.

12. The foldable roll-over protection structure as claimed in claim 1, said hinge plate being fixed to the upper section, said hinge assembly including a pivot element swingably interconnecting the hinge plate to the base section.

13. The foldable roll-over protection structure as claimed in claim 3, said vibration dampener being removably coupled to the hinge assembly, said vibration dampener being removed when the upper section is moved between said pair of said positions.

14. The foldable roll-over protection structure as claimed in claim 3, said vibration dampener being configured to dampen relative vibrational movement between the frame sections when the upper section is in multiple ones of said positions.

15. The foldable roll-over protection structure as claimed in claim 14, said vibration dampener being configured to dampen relative vibrational movement between the frame sections when the upper section is in either one of a pair of said positions; and a second resilient vibration dampener configured to dampen relative vibrational movement between the frame sections when the upper section is in a third one of said positions.

* * * * *